Oct. 13, 1970     J. L. DRISKILL     3,533,641
POWER ACTUATED UNDERCARRIAGE FOR MOBILE HOME
Filed Sept. 26, 1968     3 Sheets-Sheet 1
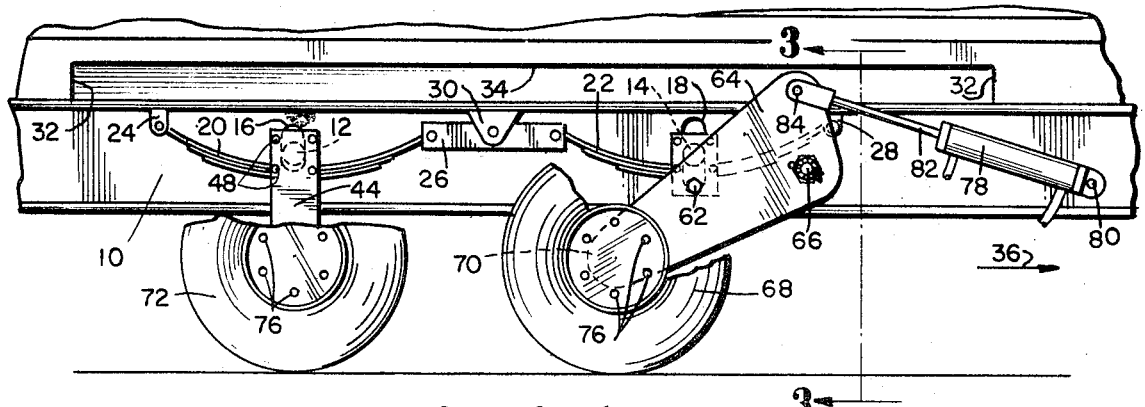
Fig. 1
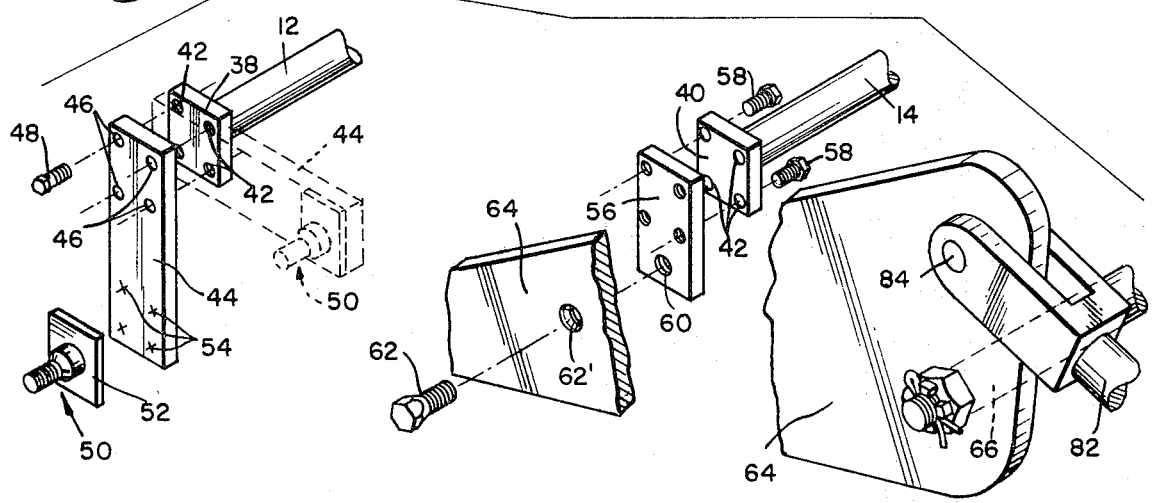
Fig. 2
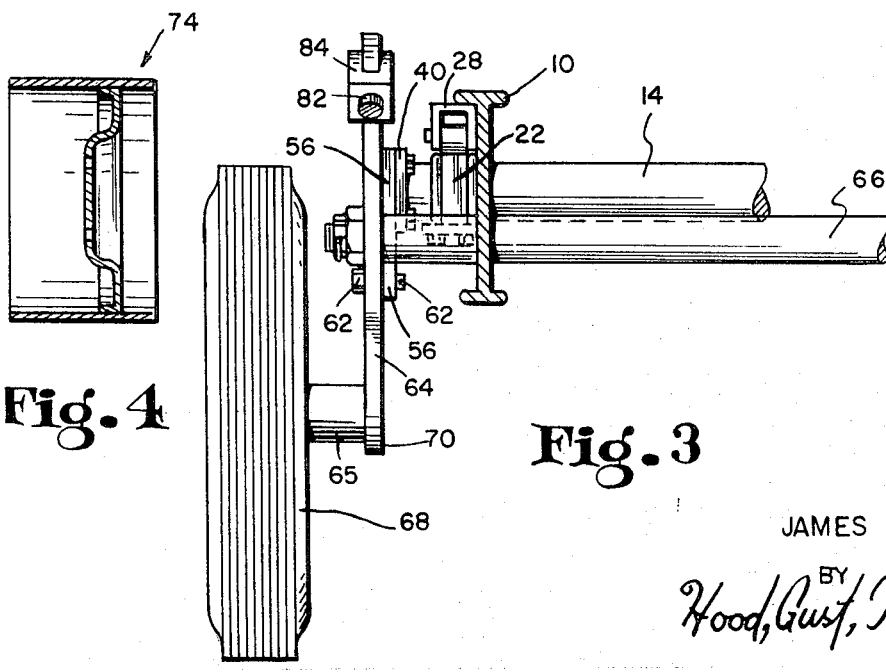
Fig. 4
Fig. 3
INVENTOR
JAMES L. DRISKILL
BY Hood, Gust, Irish & Lundy
ATTORNEY Oct. 13, 1970     J. L. DRISKILL     3,533,641

POWER ACTUATED UNDERCARRIAGE FOR MOBILE HOME

Filed Sept. 26, 1968     3 Sheets-Sheet 2

INVENTOR
JAMES L. DRISKILL
BY
Hood, Gust, Irish & Lundy
ATTORNEYS

Oct. 13, 1970   J. L. DRISKILL   3,533,641
POWER ACTUATED UNDERCARRIAGE FOR MOBILE HOME
Filed Sept. 26, 1968   3 Sheets-Sheet 3
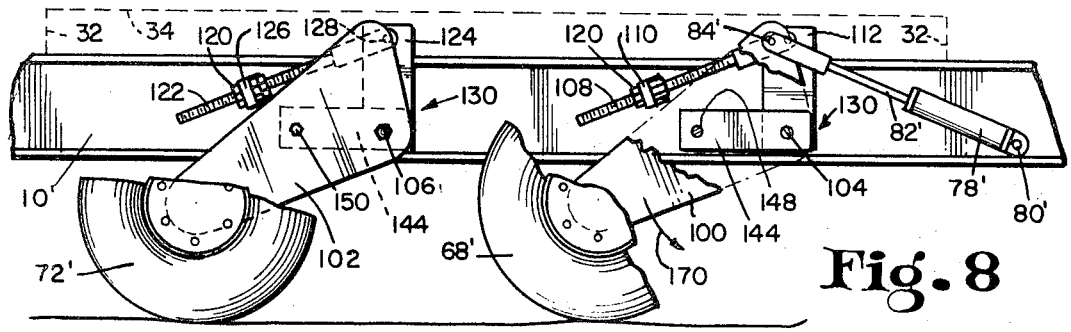
Fig. 8
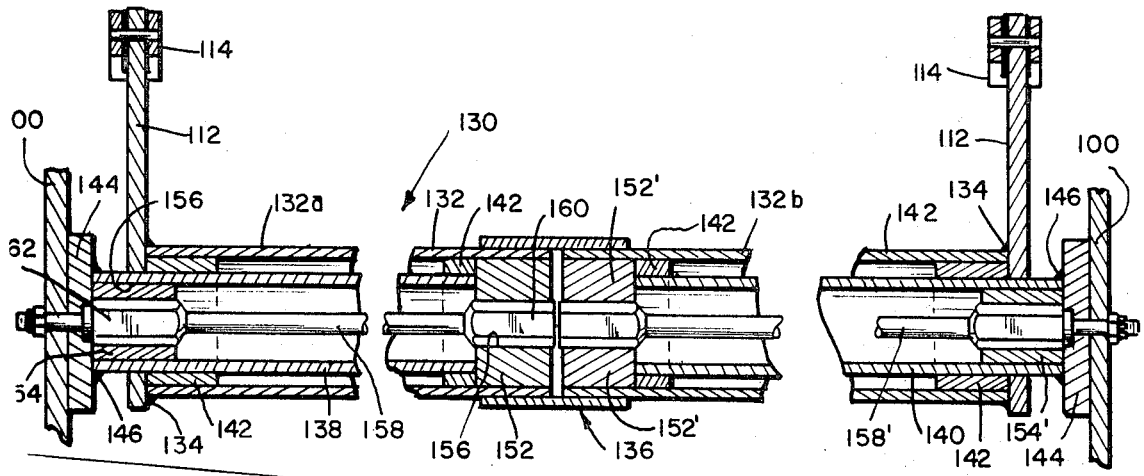
Fig. 12
Fig. 10   Fig. 11
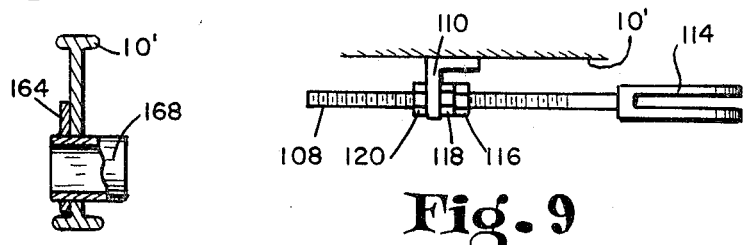
Fig. 9
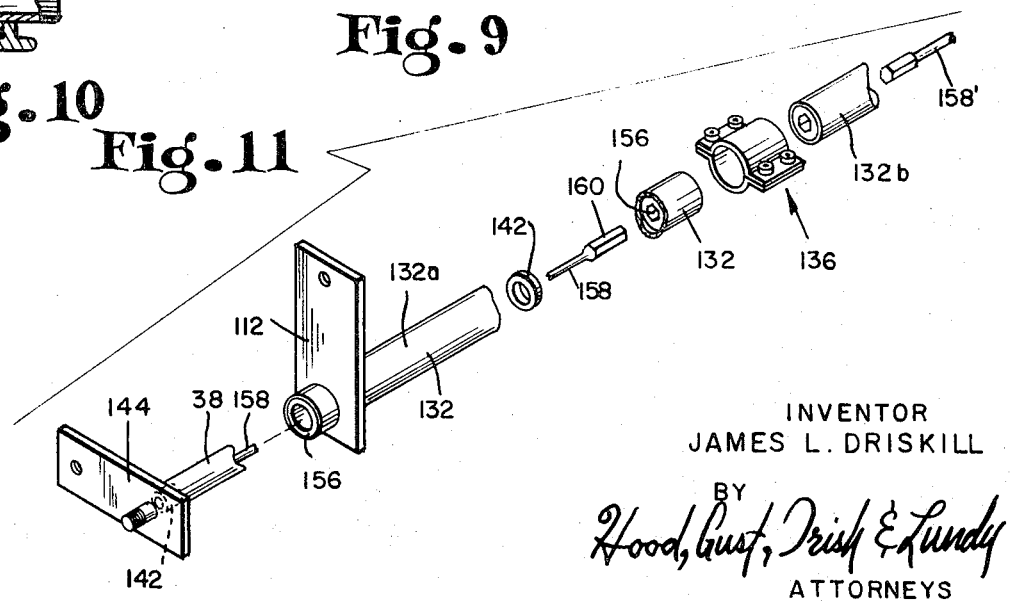
INVENTOR
JAMES L. DRISKILL
BY
Hood, Gust, Irish & Lundy
ATTORNEYS United States Patent Office 3,533,641
Patented Oct. 13, 1970

3,533,641
POWER ACTUATED UNDERCARRIAGE
FOR MOBILE HOME
James L. Driskill, 14 South Drive, Burlington Park,
Muncie, Ind. 47302
Filed Sept. 26, 1968, Ser. No. 762,712
Int. Cl. B62d 61/12
U.S. Cl. 280—43.18                      5 Claims

ABSTRACT OF THE DISCLOSURE

A mobile unit, such as a mobile home, provided with a tandem axle assembly in which a first pair of transit wheels is carried by crank means mounted to turn about an axis fixed relative to the unit chassis to raise and lower the chassis and the other, or second, pair of transit wheels. By turning the crank means in one direction, the second pair of wheels may be lifted off the ground and, by turning the crank means in the opposite direction, the first pair of wheels may be lifted off the ground. Once the first pair of wheels are lifted, they are replaced by small-diameter hubs or emergency wheels so that, when the crank means is again turned in the said one direction to press the hubs against the ground, the second pair of wheels may be lifted and removed. The hubs of the second pair of wheels are supported from an axle by adjustable means which can be so oriented relative to the axle as to dispose the same wholly in the conventional wheel well of the unit. When the hubs of the second pair of wheels are so disposed in the wheel well and the crank means is turned in such opposite direction far enough to locate the hubs carried thereby wholly in said wheel well, the chassis will rest solidly on the ground. Fluid power means is provided for turning the crank means selectively in such opposite directions so that, in an emergency, the crank means can be turned slightly in the first direction to cause the hubs carried thereby to emerge from the wheel well, thus rendering the unit readily mobile for short-distance travel.

In one illustrated form of the invention, the chassis is sprung from the crank means by leaf-spring assemblies, while in another illustrated form torsion bars perform that function. In both forms, means is provided for readily relieving the resilient means from stress resulting from manipulation of the crank means by the fluid power means.

---

The present invention relates primarily to mobile home units and is particularly concerned with power actuated mechanism for facilitating the conversion of such a unit between transit condition and occupancy condition. The large and elaborate mobile home units of today are more and more widely being used as permanent homes, remaining in one location for year after year. Thus, the mobility of such homes is utilized, in many instances, only to transport the unit from the point of its manufacture to a selected home site.

It is highly desirable that, when such a unit is to remain in one place for an extended period, it should be utterly stable in that location, not only in order to avoid even slight bodily movement of the unit but also to avoid the joggle and sway which will occur when the chassis of such a unit is sprung from wheels, as it must be for transit. Thus, it is desirable that, when such a unit has reached a site where it is to remain for an extended period, the chassis should be lowered to rest solidly upon the ground, a concrete pad, pre-prepared footings or the like. To that end, others have provided various forms of jacking means for facilitating the removal of the chassis and/or body weight from the transit wheels and/or springs; but, so far as I am aware, no truly satisfactory mechanism for that purpose has heretofore been evolved.

Among other considerations in this field is the fact that many locations which are available for long-term occupancy by such units require by regulation that such units shall be so constructed and arranged as to be readily movable in an emergency; and the fact that many insurance companies base their premium rates upon the facility with which such units may be moved. One of the objects of the present invention, therefore, is to provide means whereby a unit of the character under consideration may be converted from transit condition to stationary occupancy condition in which the unit chassis rests solidly upon the ground, while leaving the unit with wheel means on its axle and capable of ready projection into a position rendering the unit promptly mobile.

Another primary object of the invention is to provide a tandem axle assembly for such a unit and power means for manipulating one of the axles of such an assembly to lift its wheels off the ground so that they may be replaced by small-diameter hubs which can then be shifted by the power means to lift the other axles and its wheels permitting removal of the other axle wheels and the rearrangement of the mounting means therefor to positions wholly within the wheel wells of the unit, after which the power means can be activated to lower the chassis onto the ground or other suitable support while the hub means on the first axle are retracted into the wheel wells.

Still another object of the invention is to provide mechanism of the character above suggested including means whereby the power-actuated wheels will support the chassis through resilient load-bearing means when in transit condition but may be readily disconnected from such resilient means for the above described manipulation so that the load-bearing means will not be subjected to undue stress during such manipulation.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a fragmentary view of one embodiment of my hydraulically-actuated mechanism applied to the tandem axles of a mobile home;

FIG. 2 is a fragmentary, exploded perspective view, slightly enlarged, showing portions of the tandem axles and portions of my mechanism associated therewith;

FIG. 3 is a fragmentary sectional ivew, slightly enlarged, taken from FIG. 1 generally along the line 3—3;

FIG. 4 is a sectional view of a steel hub which replaces the rubber tired wheel when the mobile home is lowered to its rest position;

FIG. 8 is a fragmentary view showing another embodiment of my mechanism, which embodiment comprises a torsion bar spring system for a mobile home;

FIG. 9 is a fragmentary elevational view of a bracket used in the mechanism of FIG. 8;

FIG. 10 is a sectional view of an I-beam of a mobile home modified to accept the mechanism of FIG. 8;

FIG. 11 is an exploded perspective view of the torsion bar spring system used with the embodiment of FIG. 8; and FIG. 12 is a sectional view of the torsion bar spring system of FIG. 11.

Figure 5:
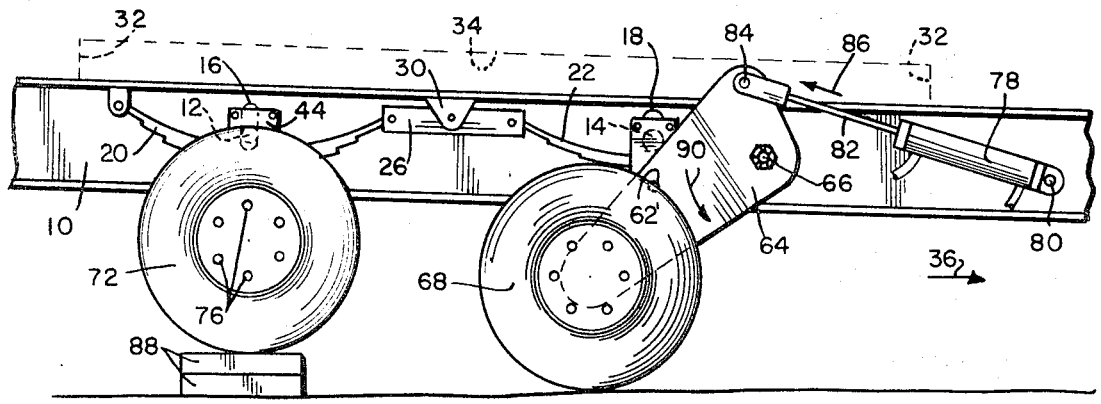
FIG. 5 is a diagrammatic view showing the first step in the process of lowering the mobile home to its rest position.

Referring now to FIG. 1, it will be seen that I have illustrated an I-beam 10 which is one of the two I-beams extending longitudinally the length of a mobile home. For reasons of simplicity, I have shown only one half of my mechanism for raising and lowering a mobile home. That is, I have shown only the portion of my mechanism which is associated with one of the two I-beams 10 extending longitudinally under the mobile home and the axles extending laterally outwardly from the one I-beam. An identical mechanism is associated with the other I-beam and the opposite ends of the axles on the other side of the mobile home.

The two illustrated axles 12, 14 which extend through vertically elongated slots 16, 18, respectively, in the I-beam 10 are supported on leaf springs 20, 22, respectively. I have illustrated hangers 24, 26, 28 for springs 20, 22, these hangers being conventionally arranged. It will be noted that the intermediate hanger 26 is mounted at its midpoint for pivotal movement about an axis defined by a stationary bracket 30.

Conventionally, the axles for a mobile home extend laterally across the home and under the I-beams comprising the support structure for the home. These axles are then connected by upright members to the springs which are conventionally located as I have illustrated in FIG. 1. I have arranged the axles 12, 14 to extend through the I-beams 10 because, when the mobile home is in its lower, rest position, the I-beams will rest directly on the ground or concrete pad upon which the home is located.

Conventionally, a mobile home is provided with a wheel well extending along each of its sides and directly above the wheels, the longitudinal extent of such a wheel well being indicated by the reference numeral 32. Conventionally, the top wall, indicated by the reference numeral 34, of a wheel well is approximately 4" above the top surface of the I-beam 10. Thus, as will be more fully explained hereinafter, my mechanism will be at least partially disposed in such a conventional wheel well.

Conventionally, the floor level of a mobile home is approximately 7½" above the top surface of the I-beam 10 which is conventionally about 10" deep. Thus, when a mobile home is in its lower, rest position as contemplated by my invention, its floor will be a mere 17½" above ground level.

In FIGS. 1, 5, 6 and 7, the arrow 36 is pointed toward the front end of the mobile home. Conventionally, the front end of such a mobile home is provided with a tongue hitch which is used for pulling the home and a tongue jack which may be used to raise and lower the front end of the home.

Since the slots 16, 18 through which the axles 12, 14, respectively, extend are formed in the vertical web of the I-beam 10, it may be advisable to strengthen the I-beam in the area of such slots by welding or otherwise fastening steel plates (not shown), commonly called fish plates, to the upper and lower flanges of the I-beam adjacent such slots.

A generally square mounting plate 38, 40 is provided on each end of each axle 12, 14 (FIG. 2), each such plate being provided with four mounting holes 42 arranged squarely as illustrated. A wheel mounting member 44 is mounted on each end of the axle 12, only one member 44 being illustrated. Each member 44 is provided with four squarely arranged mounting holes which register, respectively, with the holes 42 so that the member 44 can be mounted in its vertical position as illustrated in solid lines or in its horizontal position as illustrated in dashed lines. Four conventional fastening elements, such as indicated at 48, are provided for securing the member 44 to the plate 38.

The distal end of the member 44 carries a stub shaft 50 upon which a conventional mobile home wheel assembly is mounted. In the illustrative embodiment, the stub shaft 50 extends outwardly from a small plate 52 which is welded to the wheel mounting member 44 as indicated at 54.

The reasons why I arange the number 44 so that it can be mounted in either of its vertical or horizontal positions will be discussed in conjunction with FIGS. 5, 6 and 7.

A vertically extending mounting member 56 is mounted on each plate 40 at each end of the axle 14 by means such as the illustrated fastening elements 58. The illustrated member 56 is provided with an opening 60 through which a fastening element 62 extends. This fastening element 62 is used to fasten a bell crank 64 rigidly to the mounting member 56. Specifically, when the mobile home is in its upper, mobile position, a bell crank, such as the illustrated bell crank 64 is rigidly fastened to each end of the axle 14. These bell cranks 64 are mounted for pivotal movement about an axis defined by a trunnion 66 which extends parallel to the axis 12, 14. Thus, the trunnion 66 penetrates each I-beam 10. It will be appreciated, however, that the trunnion 66 which extends transversely between the I-beams 10 can be replaced by a shorter trunnion which extends laterally outwardly from each I-beam 10.

Referring to FIG. 1, it will be seen that the front wheel 68 is journal mounted on the end 70 of the crank 64 and that the rear wheel 72 is journal mounted on the lower end of the member 44. Thus, the front wheel 68 is connected to the spring 22 through the bell crank 64 and the rear wheel 72 is connected to the spring 20 through the member 44. It will be appreciated that, in order for the spring 22 to deflect, the crank 64 must pivot about the axis of the trunnion 66. The front wheel 68 can be disconnected from the spring 22 by removing the illustrated fastening element 62 which connects the crank 64 to the axle 14. The reasons why this removable connection is provided will become apparent as this description progresses.

Each of the wheels 68, 72 is provided with conventional electric brakes normally used with mobile homes and which do not need to be discussed, in detail, in this description.

In FIG. 4, I have illustrated a steel hub 74 which I believe should be approximately 14" in diameter and 12" long.

This hub is proportioned and designed to be mounted over the brake drum assembly of a wheel after the rim and tire have been removed. Specifically, the hub 74 can be mounted on such a wheel assembly by the conventional lugs, such as indicated at 76 in FIG. 1. For reasons to be discussed in conjunction with FIGS. 5, 6 and 7, I may provide four of such hubs 74, though in some instances only two will be used.

As illustrated in the drawings, a double-acting power cylinder 78 is provided for pivoting each crank 64 about the axis of the trunnion 66. Referring to FIG. 1, it will be seen that the cylinder 78 is pivotally connected to the I-beam 10 as indicated at 80 and its piston rod 82 is pivotally connected to the crank 64 as indicated at 84.

While I prefer to use one power cylinder 78 with each crank 64, i.e., a cylinder on each side of the undercarriage of the mobile home, it will be appreciated that I may use only one power cylinder 78 by connecting the cranks 64 so that pivotal movement of one crank will produce corresponding pivotal movement of the other crank.

I have not shown a hydraulic pump for use with the cylinder 78. Such pumps and the valving normally associated therewith are well known and need not be discussed, in detail, in this description. Preferably, such equipment as the hydraulic pump and the necessary valving will be provided by the person whose function it is to move mobile homes. That is, such equipment can be carried by the trucks which are modified to pull mobile homes. It would be economically unfeasible to provide such equipment for each mobile home.

Thus, the power cylinder 78 is a fluid motor for controllably pivoting the crank 64 about its axis. It will be appreciated that the power cylinder 78 may also be a pneumatic power cylinder.

Figure 6:
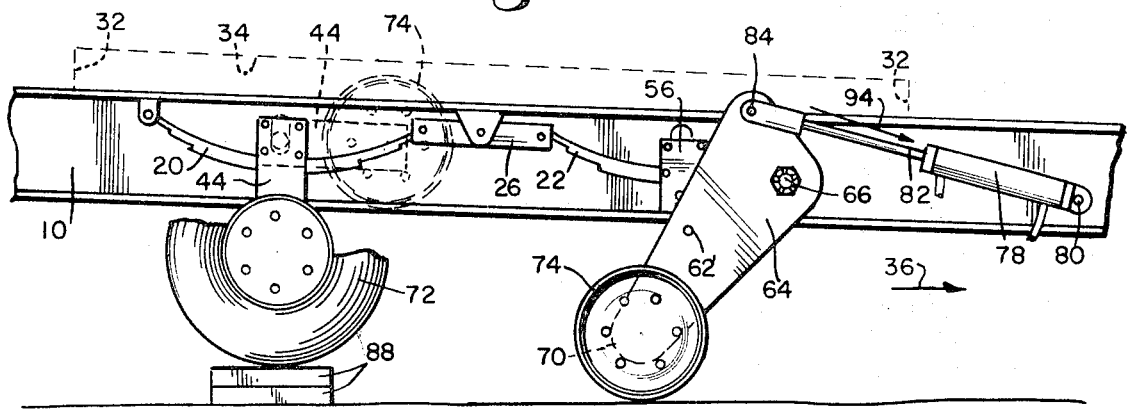
FIG. 6 is another diagrammatic view showing an intermediate step in lowering the home.
Figure 7:
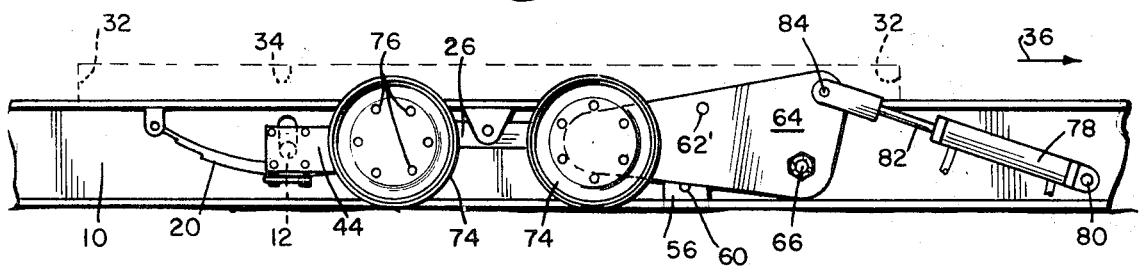
FIG. 7 is another diagrammatic view showing the support frame of the mobile home in its lower, rest position.

Referring now to FIGS. 5, 6 and 7, it will be seen that I have illustrated the manner in which my mechanism may be used to lower the I-beam 10 from its upper, mobile position to its lower, rest position directly on the ground.

When a mobile home is moved into position where it is to be left for some extended period of time, the person responsible for setting up the mobile home, i.e., getting the home ready for occupancy, can begin the process of lowering the I-beam 10 by activating the fluid motor 78 to project its piston rod 82 in the direction of the arrow 86 (FIG. 5). As soon as force is so applied to crank 64, the weight normally supported by screw 62 begins to be assumed by connector 84, thereby relieving spring 22. Thus, the beam 10 will begin to rise as spring 22 moves toward equilibrium condition and the lower end of slot 18 approaches axle 14. Usually, equilibrium will be achieved before that slot end encounters the axle; and at this point, screw 62 may be easily and safely removed, thus freeing crank 64 from spring 22 for movement to any desired degree in the direction of arrow 90.

However, in some instances it may be desirable to leave the screw 62 in place and to continue projection of piston rod 82 until spring 22 is flexed downwardly and axle 14 is encountered by the lower end of slot 18. This will cause link 26 to be rocked in a clockwise direction to lift the forward end of spring 20. Slot 16 is significantly shorter than slot 18 and, as projection of piston rod 82 continues, wheel 72 will be lifted off the ground. Once the blocks of wood 88 are placed under the wheel 72 the piston 82 may be retracted, to lift the front wheel 68 off the ground. Then, the tire and rim of the wheel 68 can be removed and replaced by a hub 74 which is of much smaller diameter as discussed previously. When the hub 74 is installed on the bell crank 64 in place of the wheel 68, and the piston 82 is again extended to pivot the crank 64 in the direction of the arrow 60, the hub 74 carried by the crank 64 will engage the ground and will, as the extension of the piston 82 is continued, lift the rear wheel 72 off the blocks 88. Thus, with the crank 64 and the hub 74 mounted thereon in the position illustrated in FIG. 6, the tire and rim of the wheel 72 can be removed and, if desired, replaced by another hub 74. In this condition of the parts, the wheel mounting member 44 can be removed from the plate 38 and then reconnected to the plate to extend horizontally so that said member 44 and any parts carried thereby will be entirely received in the space defined by the wheel well and the I-beam 10. After the member 44 has been so moved to its broken-line position illustrated in FIG. 6, the piston 82 can be retracted as indicated by the arrow 94 (FIG. 6) to pivot the crank 64 and the hub 74 mounted thereon to their positions illustrated in FIG. 7.

The position of the I-beam 10 in FIG. 7 represents the lower, rest position of that beam which corresponds of course to the lower, rest position of the mobile home.

In many cases, a less complicated and, therefore, preferable procedure can be followed in lowering the mobile home. With the vehicle in transit condition, as illustrated in FIG. 1, and with the aforementioned towing jack supporting the front end of the vehicle, the motor 78, which preferably is a double-acting hydraulic cylinder, can be activated to move the crank 64 in the direction opposite to the arrow 90 about the axle 66 axis to lift the wheel 68 off the ground so that the wheel can be replaced by the hub 74. Then, the motor 78 is activated to move the crank 74 in the direction of the arrow 90 to take the load off the screw 62 so that it can be removed. When the screw 62 is removed and the crank 64 is moved farther in the direction of the arrow 90 to urge the hub 74 journalled thereon against the ground, the wheel 72 is lifted off the ground to permit its removal and the reorientation of its mounting member 44 to be wholly disposed in the wheel well 34. Then, the piston rod 82 is retracted to permit the beam 10 to subside into its rest position and to lift the hub 74 into the wheel well 34.

In some cases, still another procedure can be followed in so lowering the mobile home. With the vehicle in transit condition, as illustrated in FIG. 1, the motor 78 can be activated as explained above to take the load off the screw 62. Now, by using an end wrench, the screw 62 can be removed and, by retracting the piston rod 82, the wheel 70 may be lifted off the ground and the rim and tire may be removed while the vehicle weight is supported on the wheels 72. It may be necessary, during this operation, to support the front of the vehicle through its towing jack. Now the hub 74 is mounted on the journal 65 carried by the crank 64; and, by projection of the piston rod 82, the wheel 72 is lifted off the ground to permit its removal and the reorientation of its mounting member 44. Now, the piston rod 82 is retracted to permit the beam 10 to subside into its rest position and to lift the hub 74 into the wheel well 34.

It will be understood that the cranks 64 on opposite sides of the mobile home must be moved substantially simultaneously in the same directions and by corresponding amounts in order to prevent lateral tipping of the home.

While I have shown only two axles 12, 14, it will be appreciated that my power-actuated mechanism may be used with mobile homes having three or more axles.

When the mobile home is to be moved, either of the processes discussed above in conjunction with FIGS. 5, 6 and 7 can be revered to lift the I-beam 10 from its lower, rest position to its upper mobile position.

It will be apparent that the hub 74 and member 44 serve no useful function in their FIG. 7 positions. However, insurance companies charge lower rates for insuring mobile homes when they are mounted on wheels. Thus, since the hub 74 does constitute a wheel, I consider that requirement of insurance companies to be met. In cases wherein insurance provisions do not require wheels on all axles, hubs 74 need not be mounted on the members 44. With my mechanism installed on a mobile home, and even with hubs 74 only on the journals 65, it will be possible to raise the home from its lower-rest position a few inches so that the home can be moved short distances on the steel hubs 74 mounted on the cranks 64.

While I have not mentioned the fact thus far, it will be apparent that the tongue jack can be manipulated to raise and lower the front end of the mobile home during the process of raising and lowering the I-beam 10. For instance, when the rear wheel 72 is mounted on the blocks of wood as illustrated in FIG. 5, the tongue jack can be used to raise the front of the I-beam 10 to keep the I-beam somewhat level.

Referring now to FIGS. 8–12, it will be seen that I have illustrated my hydraulically-actuated system used with torsion bar springs. Again, I have shown only one part of my mechanism, i.e., the part associated with one I-beam 10' of the mobile home.

Referring to FIG. 8, it will be seen that the front wheel 68' is journal mounted on a crank 100 and that the rear wheel 72' is journal mounted on a similar crank 102. These cranks 100, 102 correspond to the crank 64 discussed above. Specifically, each crank 100, 102 is mounted for pivotal movement about an axis indicated at 104, 106 in FIG. 8. The piston 82' of the power cylinder 78' is operatively connected to the crank 100 as indicated at 84'.

A large screw 108 is connected between a bracket 110 welded or otherwise securely fastened to the I-beam 10' and a vertically extending member 112 (FIG. 8). Referring to FIG. 9, it will be seen that this screw 108 is provided with an end 114 which is arranged to be pivotally connected to the member 112. I prefer to provide a pair of lock nuts 116, 118 threaded on the screw 108 on one side of the bracket 110 and a lock nut 120 threaded onto the screw 108 on the opposite side of the bracket. The function of the screw 108 and the member 112 will be discussed in conjunction with FIGS. 11 and 12.

A screw 122, similar to the screw 108, is connected between a vertically extending member 124 and a bracket 126 welded or otherwise securely fastened to the I-beam 10', the connection between the screw 122 and member 124 being a pivotal connection as indicated at 128. The screw 122 and member 124 have the same function as the screw 108 and member 112.

The torsion bar axles defining the axes 104, 106, respectively, are identical, one of such axles being illustrated in FIGS. 11 and 12.

Referring to FIGS. 11 and 12, it will be seen that the axles assembly, indicated generally by the reference numeral 130, comprises a two-part sleeve 132, the two parts being indicated at 132a and 132b. One of the vertically extending members 112 discussed previously in conjunction with FIG. 8 is welded to the outer end of each sleeve portion 132a, 132b as indicated at 134. A clamp, indicated generally by the reference numeral 136, is provided for clamping together the two sleeve portions 132a, 132b. This clamp 136 can be loosened so that one sleeve portion 132a, 132b can be adjusted about its axis relative to the other sleeve portion. A sleeve 138, 140 is journalled in each sleeve portion 132a, 132b by means of bushings indicated at 142. The sleeve 138 extends through an opening in the vertically extending member 112 and is rockable relative thereto, the external left-hand end (FIG. 12) of the sleeve 138 being welded to a longitudinally extending member 144 as indicated at 146. Referring back to FIG. 8, it will be seen that one of such members 144 is associated with each crank 100, 102. Specifically, a fastening element 148, similar to the fastening element 62 discussed previously, is provided for connecting the crank 100 to its associated member 144 and another such fastening element 150 is provided for connecting the crank 102 to its associated member 144.

The right-hand end (FIG. 12) of sleeve 140 extends through the opposite member 112 and is welded to a member 144 disposed at the opposite side of the mobile home.

A bushing 152 (FIG. 12) is inserted into the inner end of the sleeve portion 132a and welded thereto, and a similar bushing 154 is inserted into the outer end of the sleeve 138 and welded thereto. In the illustrative embodiment, the axially extending openings 156 in these bushings 152, 154 are hexagonal in cross section. I have illustrated a torsion bar 158 having ends 160, 162 formed with a hexagonal cross section and, respectively, snugly received in the bushings 152, 154. This torsion bar 158 thus serves resiliently to connect the member 144 to the member 112. A similar torsion bar 158' (FIG. 12) provides a similar connection between the member 112 and the member 144 at the opposite end of the axle assembly 130.

Referring now to FIG. 8, it will be seen that, with respect to the crank 100, since the member 144 is connected to the crank 100 by the fastening element 148 and since the member 112 is held rigidly by means of the screw 108, movement of the wheel 68' about the axis 104 relative to the member 112 will be resisted by the torsion bar 158. The torsion bar 158 thus serves as a spring for the front wheel 68. Similarly, the torsion bar 158 of the axle assembly 130 associated with the crank 102 serves as a spring for the rear wheel 72'.

Referring to FIG. 10, it will be seen that I have illustrated a strengthening plate 164 welded or otherwise fastened to the I-beam 10' and a bushing 168 extending through the I-beam and plate. The sleeve portion 132a extends through, and is supported in, this bushing 168.

Each member 112, 124 can be adjustably positioned by manipulating the screw 108, 122 associated therewith. Adjustment of each member 112, 124 about its axis 104, 106 rotates the sleeve portion 132a, 132b connected thereto about its axis. Referring to FIG. 12, it will be seen that, when the clamp 136 is loosened, one sleeve portion 132a, 132b can be rotated about its axis relative to the other sleeve portion. I have provided this means for adjustably positioning the members 112, 124 and the sleeve portions 132a, 132b connected thereto so that, if one side of the mobile home is heavier than the other side, the side which is heavier can be jacked up by adjusting the screws 108, 122 on that side of the home.

In this form of the invention, the first step in the procedure of lowering the I-beam 10' involves backing the nuts 116, 118 on the screw 108 away from the bracket 110. Since the vehicle weight is applying force to the member 112 through the wheel 68', crank 100, connector 148, arm 144 and torsion bar 158 tending to turn member 112 in a clockwise direction as viewed in FIG. 8, those nuts are not currently sustaining any load. Now, motor 78' is energized to project its piston rod 82', whereby arm 144 will be turned in a counterclockwise direction, tending to permit the torsion bar 158 to unwind toward equilibrium condition and to shift the vehicle weight from the connector 148 to the connector 84'. When the torsion bar reaches equilibrium condition, further projection of piston rod 82' will begin to turn member 112 in a counterclockwise direction while screw 108, now unfettered by the backed-away nuts 116, 118, will slide downwardly and rearwardly through the bracket 110. As this movement continues, the beam 10' will be lifted, crank 102 will turn in a counterclockwise direction until its torsion bar reaches equilibrium condition and ultimately wheel 72' will be raised from the ground so that it can be blocked in the manner suggested in FIG. 5.

Now, activation of motor 78' may be reversed to lift wheel 68' off the ground so that that wheel may be removed and replaced by a hub 74. Upon such reversal of motor 78', of course, screw 108 will be drawn upwardly through the bracket 110 to move nut 120 into engagement with the bracket, and torsion bar 158 will again be twisted.

After hub 74 has been mounted on crank 100, motor 78' will be activated again to project piston rod 82'. When torsion rod 158 again achieves equilibrium condition, connector 148 will have been relieved of all load and can be readily removed, thus freeing crank 100 from arm 144 and permitting the crank to be turned, without affecting torsion bar 158, far enough in the direction of arrow 170 to press the hub 74 against the ground and lift the wheel 72' off its blocks. Wheel 72', of course, will drop relative to beam 10' until its associated torsion bar achieves equilibrium condition. Wheel 72' may now be removed; and, either by removing connector 150 or by backing nut 120 on screw 122 away from bracket 126, the crank 102 may be turned wholly into the wheel well.

Now, by activating motor 78' to retract piston rod 82', crank 100 may be turned in a clockwise direction gradually to lower the beam 10' until it rests solidly on the ground or other support, and to lift the hub 74 wholly into the wheel well.

Alternatively, with the parts in the positions of FIG. 8 and with the front of the vehicle suitably supported, motor 78' may be activated to retract piston rod 82' to lift wheel 68', against the tendency of its torsion bar 158, off the ground. Wheel 68' is now removed and replaced by a hub 74. Now motor 78' is reversed until hub 74 engages the ground and beam 10' begins to rise. The front support of the vehicle may now be removed. When crank 100 and connected arm 144 have been turned in the direction of arrow 170 to bring torsion bar 158 to equilibrium condition, connector 148 is removed and projection of piston rod 82' is continued until wheel 72' is lifted off the ground. Now wheel 72' is removed and the previously-described procedure is followed to move cranks 102 and 100 into the wheel well and to lower the beam 10' to solid rest position.

What is claimed is:

1. A mobile unit comprising a chassis, transversely-aligned trunnion means fixed relative to said chassis, corresponding crank means journalled on said trunnion means at opposite sides of said chassis, a wheel journalled from one arm of each of said crank means, resilient load-bearing means at each side of said chassis, means separably connecting said load-bearing means to said crank arms, respectively, at points between said trunnion means and the axis of the associated wheel, and fluid motor means operatively connected between said chassis and at least one of said crank means for turning both of said crank means correspondingly about the common axis of said trunnion means when said connecting means is separated, said load-bearing means comprising a shackled spring assembly at each side of said chassis, an axle means tethered to said spring assemblies, said axle means being restricted to limited vertical movement relative to said chassis adjacent each side of said chassis, and said connecting means comprising, at each side of said unit, a removable element connecting said one crank arm to the corresponding end of said axle means.

2. A mobile unit comprising a chassis, a first axle means mounted on said chassis for limited vertical movement relative thereto, spring means at each side of said chassis and tethered to said axle means adjacent the opposite sides of said chassis for resiliently supporting said chassis from said axle means, means secured to said axle means at each end thereof and carrying a stub shaft, a wheel journalled on each of said stub shafts, transversely-aligned trunnion means fixed relative to said chassis upon an axis substantially parallel with said axle means, corresponding crank means journalled on said trunnion means at opposite sides of said chassis, a wheel journalled from one arm of each of said crank means, resilient load-bearing means at each side of said chassis, means separably connecting said load-bearing means to said crank arms, respectively, at points between said trunnion means and the axis of the associated wheel, and fluid motor means operatively connected between said chassis and at least one of said crank means for turning both of said crank means correspondingly about the common axis of said trunnion means when said connecting means is separated, said axle means and said trunnion means being disposed on the same side of the center of length of said chassis whereby, when said crank means is so turned in one direction, said axle means will be elevated to lift said first-named wheels.

3. The mobile unit of claim 2, in which said means carrying a stub shaft is removably and adjustably secured to said axle means to occupy, alternatively, a position depending from said axle means or a position extending substantially horizontally from said axle means.

4. The mobile unit of claim 2 in which said resilient load-bearing means comprises a shackled spring assembly at each side of said chassis, the adjacent ends of said spring means and of said spring assembly at each side of said chassis being secured to opposite ends of a hanger pivoted intermediate its ends upon said chassis to rock about an axis disposed between and parallel to said axle and said trunnion axis.

5. The mobile unit of claim 4 in which said means carrying a stub shaft is removably and adjustably secured to said axle means to occupy, alternatively, a position depending from said axle means or a position extending substantially horizontally from said axle means.

References Cited

UNITED STATES PATENTS

| | | | |
|---|---|---|---|
| 2,698,668 | 1/1955 | McKay | 180—22 |
| 3,062,558 | 11/1962 | Krolicki | 280—43.23 |
| 3,178,201 | 4/1965 | Richnow | 180—22 |
| 3,240,506 | 3/1966 | McMullen | 280—43.23 |
| 3,315,978 | 4/1967 | Chieger et al. | 280—104.5 |
| 3,361,440 | 1/1968 | Green | 280—43.18 |
| 3,384,384 | 5/1968 | Diehl | 280—43.18 |
| 3,342,505 | 9/1967 | Diehl | 280—43.18 |

FOREIGN PATENTS 1,379,029  10/1964  France.

BENJAMIN HERSH, Primary Examiner

L. J. PAPERNER, Assistant Examiner

U.S. Cl. X.R.

280—43.23, 104.5